(12) United States Patent
Iwai et al.

(10) Patent No.: US 11,487,009 B2
(45) Date of Patent: Nov. 1, 2022

(54) IMAGE CAPTURE CONTROL DEVICE, IMAGE CAPTURE CONTROL METHOD, AND RECORDING MEDIUM

(71) Applicant: PANASONIC INTELLECTUAL PROPERTY MANAGEMENT CO., LTD., Osaka (JP)

(72) Inventors: Hiroshi Iwai, Osaka (JP); Hiroshi Iwamura, Hiroshima (JP); Osamu Shibata, Hyogo (JP); Tomohiro Honda, Shiga (JP); Tomohito Nagata, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 813 days.

(21) Appl. No.: 16/437,965

(22) Filed: Jun. 11, 2019

(65) Prior Publication Data
US 2019/0293791 A1 Sep. 26, 2019

Related U.S. Application Data

(63) Continuation of application No. PCT/JP2017/040867, filed on Nov. 14, 2017.

(30) Foreign Application Priority Data

Dec. 14, 2016 (JP) .............................. JP2016-242521

(51) Int. Cl.
*G09G 5/08* (2006.01)
*G01S 17/10* (2020.01)
(Continued)

(52) U.S. Cl.
CPC ................ *G01S 17/10* (2013.01); *G01C 3/06* (2013.01); *G01S 7/484* (2013.01); *G01S 17/93* (2013.01);
(Continued)

(58) Field of Classification Search
CPC .......... G01S 17/10; G01S 7/484; G01S 17/93; G01C 3/06; G06T 7/20; G08G 1/16; H04N 5/33
(Continued)

(56) References Cited

U.S. PATENT DOCUMENTS

2010/0271617 A1* 10/2010 Damink ................ G01S 17/931
  398/118
2016/0010986 A1* 1/2016 Sun ........................ G01S 17/894
  356/5.01
(Continued)

FOREIGN PATENT DOCUMENTS

JP  S59-79173 A   5/1984
JP  H07-280940 A  10/1995
(Continued)

OTHER PUBLICATIONS

Search Report issued in International Bureau of WIPO Patent Application No. PCT/JP2017/040867, dated Feb. 13, 2018, along with an English translation thereof.

*Primary Examiner* — Jennifer T Nguyen
(74) *Attorney, Agent, or Firm* — Greenblum & Bernstein, P.L.C.

(57) ABSTRACT

An image capture control device includes a recognition unit that determines whether a peripheral situation corresponds to a predetermined situation based on image data, and a controller that controls an infrared light irradiation unit to increase a pulse number of transmission pulses to be emitted to a target, when the recognition unit determines that the peripheral situation corresponds to the predetermined situation.

15 Claims, 9 Drawing Sheets

(51) Int. Cl.
    *G06T 7/20*      (2017.01)
    *H04N 5/33*      (2006.01)
    *G01S 7/484*     (2006.01)
    *G01C 3/06*      (2006.01)
    *G01S 17/93*     (2020.01)
    *G08G 1/16*      (2006.01)

(52) U.S. Cl.
    CPC .............. *G06T 7/20* (2013.01); *G08G 1/16* (2013.01); *H04N 5/33* (2013.01)

(58) Field of Classification Search
    USPC ........................................................ 345/166
    See application file for complete search history.

(56) References Cited

U.S. PATENT DOCUMENTS

| | | | |
|---|---|---|---|
| 2017/0140230 A1* | 5/2017 | Yoshida | G06T 17/00 |
| 2018/0275279 A1 | 9/2018 | Iwai et al. | |
| 2019/0072648 A1 | 3/2019 | Iwai et al. | |

FOREIGN PATENT DOCUMENTS

| | | | |
|---|---|---|---|
| JP | 2007-271373 | * 10/2007 | .............. G01V 8/10 |
| JP | 2007-271373 A | 10/2007 | |
| WO | 2016/027289 A1 | 2/2016 | |

\* cited by examiner

IMAGE CAPTURE CONTROL DEVICE, IMAGE CAPTURE CONTROL METHOD, AND RECORDING MEDIUM

CLAIM FOR PRIORITY

This application is a Continuation of PCT/JP2017/040867 filed Nov. 14, 2017, and claims the priority benefit of Japanese application 2016-242521 filed Dec. 14, 2016, the contents of which are expressly incorporated by reference herein in their entireties.

TECHNICAL FIELD

The present disclosure relates to an image capture control device, an image capture control method, a program, and a recording medium.

BACKGROUND ART

PTL 1 discloses a distance image sensor of a time-of-flight (TOF) type as a sensor for capturing an image of a measuring object that moves or stands still (hereinafter, referred to as a "target"), and measuring a distance to the target.

Such a distance image sensor of the TOF type includes an infrared light irradiation unit and an infrared light reception unit. A distance between the distance image sensor and the target is measured based on a time difference or a phase difference between irradiation timing at which the infrared light irradiation unit emits irradiation light and light reception timing at which the infrared light reception unit receives reflected light (that is, light in which the irradiation light is reflected by the target).

CITATION LIST

Patent Literature

PTL 1: Unexamined Japanese Patent Publication No. 59-79173

SUMMARY

The present disclosure provides a technique for accurately measuring a distance to a target.

An aspect of the present disclosure is directed to an image capture control device that includes a recognition unit that determines whether a peripheral situation corresponds to a predetermined situation based on image data, and a controller that controls an infrared light irradiation unit to increase a pulse number of transmission pulses to be emitted to a target when the recognition unit determines that the peripheral situation corresponds to the predetermined situation.

Note that an aspect of the present disclosure may be directed to a method, a program, and a tangible recording medium that records the program and is not transitory.

According to the present disclosure, a distance to a target can be measured with high accuracy.

DESCRIPTION OF EMBODIMENT

Prior to describing an exemplary embodiment according to the present disclosure, a problem found in a conventional technique will briefly be described. In the distance image sensor disclosed in, for example, PTL 1, distance measuring accuracy may be lowered when a situation that lowers light intensity of the reflected light to be received by an infrared light reception unit is present in the periphery.

Exemplary Embodiment

With reference to FIGS. 1 to 8, an exemplary embodiment according to the present disclosure will be described below. Note that in the following description of the exemplary embodiment, components (including elemental steps) are not always essential, except for a case of clearly indicating that they are essential and a case in which it is conceivable that they are obviously essential in terms of a principle, for example. Note that infrared light described in the following exemplary embodiment may be near-infrared light.

1 IMAGING DEVICE

Figure 1:
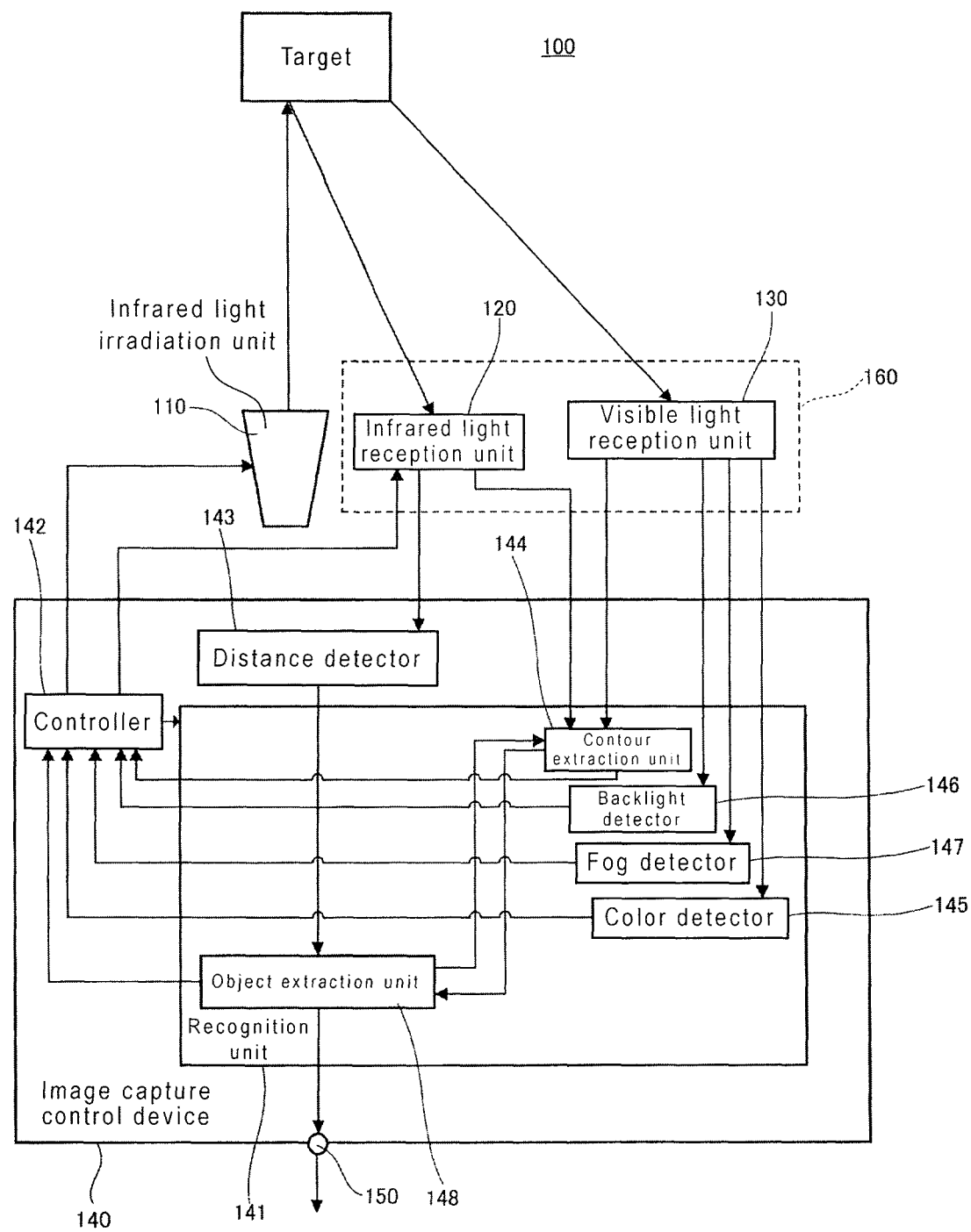
FIG. 1 is a schematic diagram illustrating a configuration of an imaging device into which an image capture control device according to an exemplary embodiment of the present disclosure is embedded.

With reference to FIG. 1, a schematic configuration of imaging device 100 into which an image capture control device according to the present disclosure is embedded will be described first. FIG. 1 is a block diagram illustrating a configuration example of the imaging device.

Imaging device 100 illustrated in FIG. 1 generates image data such as visible light image data that is an image used for identifying an external appearance of a target, infrared image data (hereinafter, referred to as "IR image data"), and distance image data of a distance between imaging device 100 and the target. The imaging device 100 generates object identification (ID) data of the target.

Imaging device 100 described above is mounted on a vehicle as a device that images the periphery of the vehicle (typically, the front), for example. The image data and the object ID data that are generated by imaging device 100 are transmitted to an electronic control unit (ECU) of an advanced driving assistant system (hereinafter, referred to as an "ADAS") disposed at a subsequent stage of imaging device 100.

1.1 Specific Configuration of Imaging Device

A specific configuration of imaging device 100 illustrated in FIG. 1 will be described below. Imaging device 100 includes infrared light irradiation unit 110, infrared light reception unit 120, visible light reception unit 130, and image capture control device 140.

1.2 Infrared Light Irradiation Unit

Figure 4A:
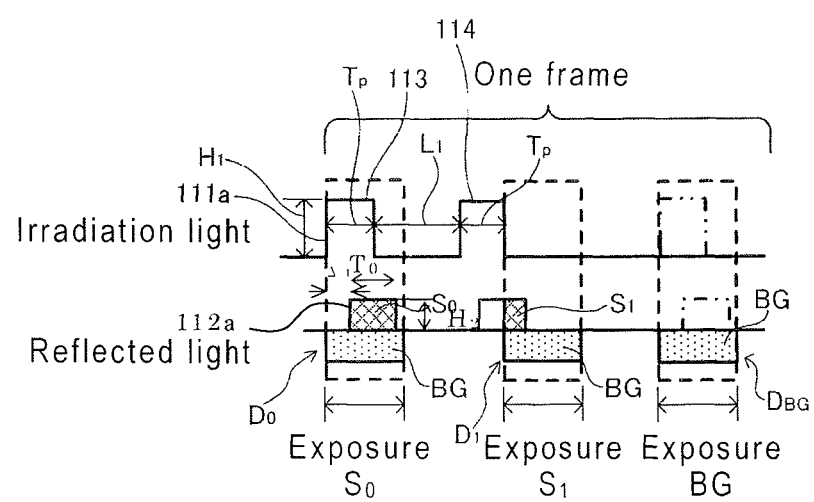
FIG. 4A is a schematic diagram illustrating states of irradiation light and reflected light when an image capture control method of the exemplary embodiment is not performed.
Figure 4B:
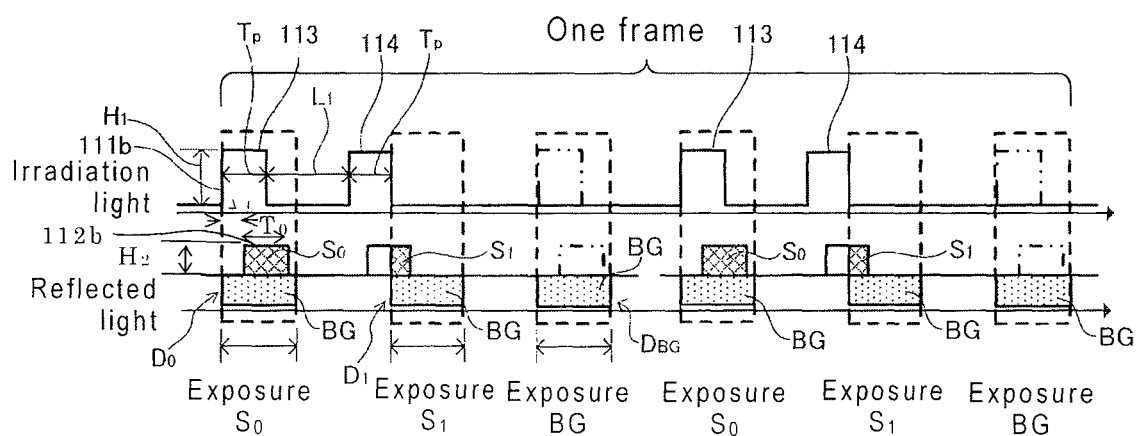
FIG. 4B is a schematic diagram illustrating the states of the irradiation light and the reflected light when the image capture control method of the exemplary embodiment is performed.

Infrared light irradiation unit 110 irradiates at least an imaging range of the distance image data with infrared light pulses (hereinafter, referred to as "transmission pulses"). Specifically, infrared light irradiation unit 110 emits, for example, irradiation light 111a, 111b as illustrated in FIGS. 4A, 4B, respectively. Irradiation light 111a, 111b will be described later.

Conditions of the transmission pulses (e.g., a width, amplitude, pulse intervals, a pulse number of pulses) emitted by infrared light irradiation unit 110 are controlled by image capture control device 140 described later.

1.3 Infrared Light Reception Unit

Infrared light reception unit 120 is, for example, a complementary metal oxide semiconductor (CMOS) image sensor, and receives the infrared light to generate the IR image data.

Light reception conditions (e.g., an exposure time, exposure timing, and the number of exposure times) of infrared light reception unit 120 are controlled by image capture control device 140 described later.

1.4 Visible Light Reception Unit

Visible light reception unit 130 is the CMOS image sensor, for example, and receives visible light of black and white (BW) or visible light of color (red, green, and blue (RGB)) to generate visible light image data.

Light reception conditions (e.g., an exposure time, exposure timing, and the number of exposure times) of visible light reception unit 130 are controlled by image capture control device 140 described later.

In the present exemplary embodiment, infrared light reception unit 120 and visible light reception unit 130 are configured with common image sensor 160. However, infrared light reception unit 120 and visible light reception unit 130 can be configured with separated image sensors.

Further, in the present exemplary embodiment, an optical system (not illustrated) that introduces light (infrared light and visible light) to infrared light reception unit 120 and visible light reception unit 130 is a common optical system. However, separated optical systems may introduce light to infrared light reception unit 120 and visible light reception unit 130.

1.5 Image Capture Control Device

Image capture control device 140 controls units configuring imaging device 100. Image capture control device 140 includes recognition unit 141, controller 142, and output unit 150.

Figure 2:
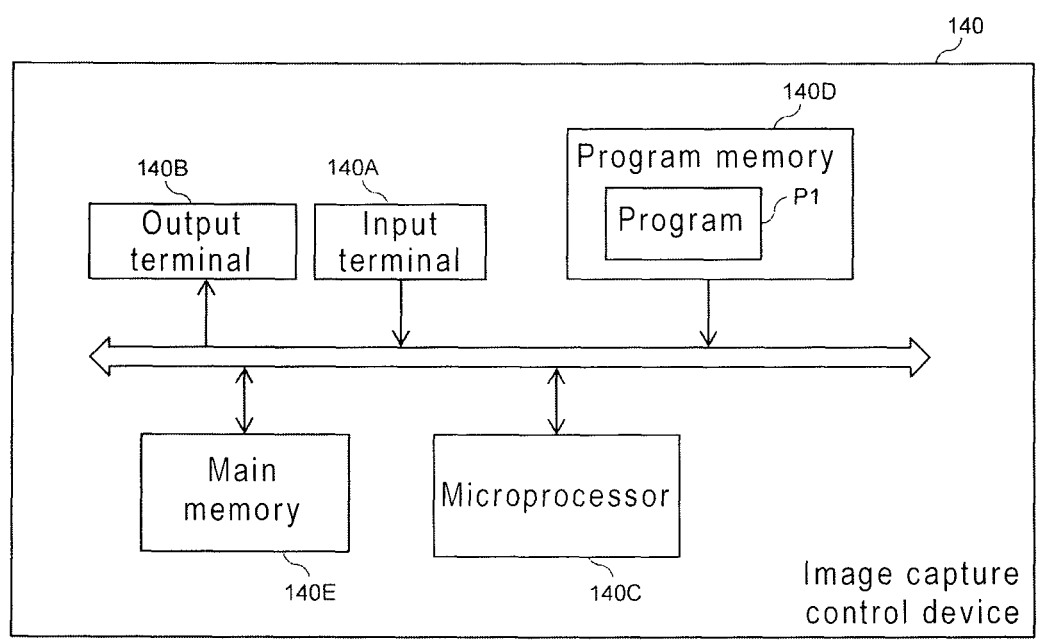
FIG. 2 is a schematic diagram illustrating a configuration of the image capture control device according to the exemplary embodiment of the present disclosure.

Image capture control device 140 is configured with, for example, input terminal 140A, output terminal 140B, microprocessor 140C, program memory 140D, and main memory 140E as illustrated in FIG. 2.

The above program memory retains program P1. The program memory may be a nonvolatile semiconductor memory such as an electrically erasable and programmable read only memory (EEPROM).

The above main memory stores various pieces of data associated with execution of a program. The main memory may be a volatile semiconductor memory such as a static random access memory (SRAM) or a dynamic random access memory (DRAM).

The microprocessor reads the program from the program memory and executes the program using the main memory to implement various functions of Image capture control device 140.

The functions of image capture control device 140 may be implemented as a logic circuit such as a field programmable gate array (FPGA) or an application specific integrated circuit (ASIC), or a program.

Hereinafter, the various functions of image capture control device 140 will be described.

1.6 Recognition Unit

Recognition unit 141 determines whether a peripheral situation corresponds to a predetermined situation based on the visible light image data generated by visible light reception unit 130. Recognition unit 141 includes distance detector 143, contour extraction unit 144, color detector 145, backlight detector 146, fog detector 147, and object extraction unit 148. Note that recognition unit 141 does not always need to include all configurations described above, but may include a part of the configurations.

The predetermined situation is a situation in which light intensity of reflected light is lowered. The reflected light is light in which irradiation light 111a, 111b of infrared light irradiation unit 110 is reflected by the target. Specifically, the predetermined situation is a situation in which backlight is present in the periphery, a situation in which fog is preset in the periphery, and a situation in which a color whose reflection rate for the IR light is lower than a predetermined threshold value for the reflection rate (e.g., black or gray: hereinafter referred to as a "low reflective color") is included.

1.7 Distance Detector

Distance detector 143 detects a distance to the target based on the IR image data generated by infrared light reception unit 120. Distance detector 143 generates the distance image data based on the detected distance. A distance detection method of distance detector 143 will be described later.

Distance detector 143 can extract a part of the IR image data by regionally dividing the IR image data. The distance image data is generated based on the extracted part of the IR image data. Note that the part of the IR image data includes the IR image data associated with the target, for example.

1.8 Contour Extraction Unit

Contour extraction unit 144 extracts a contour of the target from the visible light image data generated by visible light reception unit 130 or the IR image data generated by infrared light reception unit 120, to generate contour data. Note that, when contour extraction unit 144 extracts the contour of the target from the IR image data to generate the contour data, imaging device 100 may not include visible light reception unit 130.

Figure 5A:
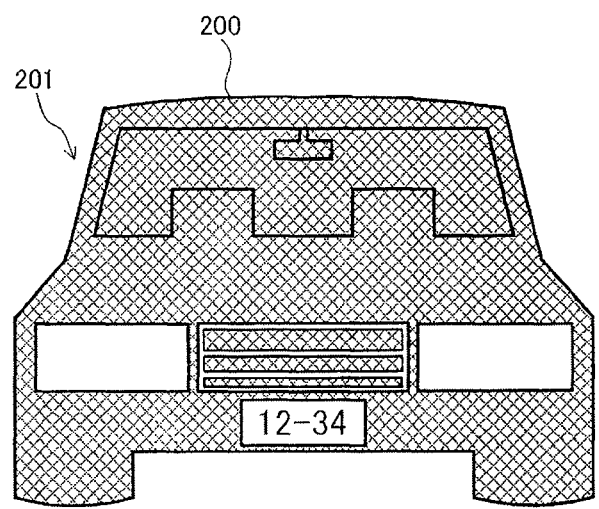
FIG. 5A is a view displaying visible light image data of a black vehicle.
Figure 5B:
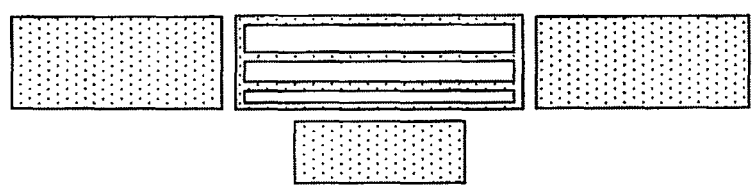
FIG. 5B is a view displaying distance image data of the vehicle illustrated in FIG. 5A obtained when the image capture control method of the exemplary embodiment is not performed.
Figure 5C:
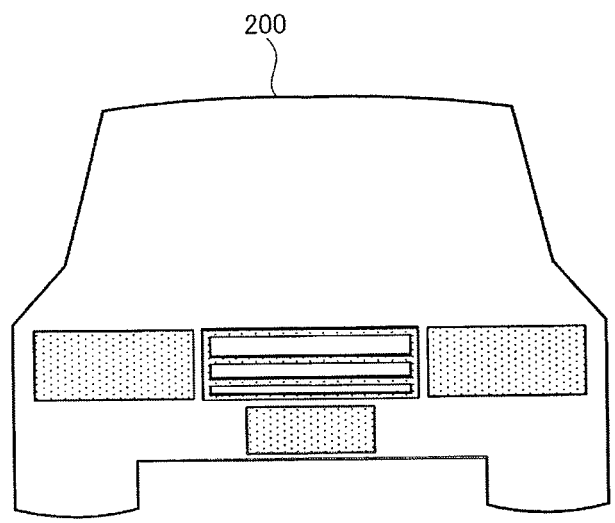
FIG. 5C is a view in which a contour extracted by a contour extraction unit is displayed on a distance image in FIG. 5B.

Specifically, when the visible light image data or the IR image data of the target is vehicle 201 illustrated in FIG. 5A, contour extraction unit 144 extracts contour 200 as illustrated in FIG. 5C from this visible light image data. Note that the visible light image data or the IR image data may simply be referred to as image data.

1.9 Color Detector

Color detector 145 determines whether the target includes the low reflective color based on the visible light image data or the IR image data. Note that the predetermined threshold value for the reflection rate is set to be a value associated with brightness, for example.

Specifically, color detector 145 determines whether a portion of the low reflective color is present inside the contour of the target extracted by contour extraction unit 144 in the visible light image data or the IR image data. Color detector 145 detects a ratio of an area of the portion of the low reflective color to an entire area inside the contour.

1.10 Backlight Detector

Backlight detector 146 determines whether the backlight is present based on the visible light image data or the IR image data. Note that whether the backlight is present is determined based on information on brightness of the visible light image data or the IR image data, for example. Besides this method, a method for determining whether the backlight is present can adopt various methods that have been conventionally known.

1.11 Fog Detector

Fog detector 147 determines whether the fog is present based on the visible light image data or the IR image data. Note that whether the fog is present is also determined based on the information on the brightness of the visible light image data or the IR image data, for example. Besides this method, a method for determining whether the fog is present can adopt various methods that have been conventionally known.

1.12 Object Extraction Unit

Object extraction unit 148 extracts the target (that is, an object) from the distance image data generated by distance detector 143. Object extraction unit 148 extracts distance image data of a portion corresponding to the target in the distance image data generated by distance detector 143. Note that, when imaging device 100 is mounted on the vehicle, the target is various objects associated with vehicle traveling, such as another vehicle, a pedestrian, or a traffic sign.

Object extraction unit 148 further determines whether a portion whose distance is inappropriately detected is present in the distance image data associated with the target.

When determining that the distance image data associated with the target is inappropriate, object extraction unit 148 instructs contour extraction unit 144 to extract the contour of the target from the visible light image data or the IR image data. Object extraction unit 148 instructs contour extraction unit 144 directly or through controller 142 to be described later.

When color detector 145 determines that the target includes the low reflective color, object extraction unit 148 can instruct controller 142 to increase or decrease a pulse number of transmission pulses of infrared light irradiation unit 110. Note that contour extraction unit 144 may instruct controller 142 to increase or decrease the pulse number of transmission pulses, instead of object extraction unit 148.

When instructing controller 142 to increase or decrease the pulse number of transmission pulses, object extraction unit 148 or contour extraction unit 144 instructs controller 142 to decrease a frame rate of the IR image data.

Object extraction unit 148 further generates object ID data of the target. Object extraction unit 148 then gives an object ID to the target in the distance image data.

Note that recognition unit 141 outputs output data such as the object ID data, the IR image data, the distance image data, and the visible light image data from the output terminal of output unit 150. The output data is transmitted to the ECU of the ADAS described above, for example. Note that the output data includes at least one of the object ID data, the IR image data, the distance image data, and the visible light image data.

1.13 Controller

Controller 142 controls, for example, a width and amplitude (intensity) of the transmission pulses emitted by infrared light irradiation unit 110, pulse intervals, and the pulse number of transmission pulses.

Specifically, when recognition unit 141 determines that the peripheral situation corresponds to the predetermined situation, controller 142 controls infrared light irradiation unit 110 to increase or decrease the pulse number of transmission pulses.

Further, when recognition unit 141 determines that the target includes the low reflective color (that is, corresponds to the predetermined situation), controller 142 controls infrared light irradiation unit 110 to increase or decrease the pulse number of transmission pulses. Note that, when a vehicle speed (or a relative speed between imaging device 100 and the target) exceeds a predetermined threshold value for the speed, the pulse number of transmission pulses may not be increased, which is a matter of course. Note that the vehicle speed is obtained from the ECU of the vehicle, for example.

Controller 142 may control infrared light irradiation unit 110 to increase or decrease intensity (luminosity) of the transmission pulses as well as increase or decrease the pulse number of transmission pulses.

In addition, when a portion having a distance difference greater than or equal to a predetermined threshold value for a distance is present inside the contour of the target in the distance image data, controller 142 may control recognition unit 141 to determine whether the peripheral situation corresponds to the predetermined situation based on the visible light image data.

Controller 142 may control distance detector 143 to extract the part of the IR image data by increasing or decreasing the pulse number of transmission pulses, and regionally dividing the IR image data generated by infrared light reception unit 120.

In this case, controller 142 may control distance detector 143 to generate the distance image data based on the IR image data of the extracted part. Note that the part of the IR image data includes the IR image data associated with the target, for example.

Controller 142 controls an exposure time and exposure timing of infrared light reception unit 120. Controller 142 also controls an exposure time and exposure timing of visible light reception unit 130.

In the present exemplary embodiment, infrared light reception unit 120 and visible light reception unit 130 are configured with the common image sensor. Therefore infrared light reception unit 120 and visible light reception unit 130 are synchronized with each other in exposure time and exposure timing.

Note that infrared light reception unit 120 and visible light reception unit 130 can be configured with separated image sensors. In this case, controller 142 controls infrared light reception unit 120 and visible light reception unit 130 such that the IR image data, the distance image data, and the visible light image data correspond to one another in a one-to-one basis.

Controller 142 also sets frame rates for the IR image data generated by infrared light reception unit 120 and the visible light image data generated by visible light reception unit 130.

Specifically, controller 142 sets the frame rates for the IR image data and the visible light image data according to the pulse number of transmission pulses emitted by infrared light irradiation unit 110.

For example, when the pulse number of transmission pulses emitted by infrared light irradiation unit 110 is greater than that in a normal state, controller 142 sets the frame rate for the IR image data smaller than that in the normal state.

When color detector 145 determines that an area rate of the portion with the low reflective color to an entire area inside the contour of the target is less than or equal to a predetermined threshold value for the area rate, controller 142 may not decrease the frame rate for the IR image data.

When the target is a moving object, controller 142 may not decrease the frame rate for the IR image data.

Further, controller 142 may set the frame rate for the IR image data according to the vehicle speed obtained from the ECU of the vehicle.

Specifically, when the vehicle speed (or the relative speed between imaging device 100 and the target) is greater than or equal to the predetermined threshold value for the speed, controller 142 may not decrease the frame rate for the IR image data.

1.14 Output Unit

Output unit 150 includes the output terminal. Output unit 150 outputs an output signal to, for example, the ECU of the ADAS from the output terminal. Note that the output signal includes at least one type of data among the IR image data, the visible light image data, the distance image data, and the object ID data, for example.

2 IMAGING DATA GENERATED BY IMAGING DEVICE

Hereinafter, the visible light image data, the IR image data, the distance image data, and the object ID data that are generated by imaging device 100 will be described.

2.1 Visible Light Image Data

The visible light image data is generated based on the visible light received by visible light reception unit 130. The visible light image data is used when contour extraction unit 144 extracts the contour of the target.

The visible light image data is also used when backlight detector 146 detects the backlight. The visible light image data is also used when fog detector 147 detects the fog.

In the present exemplary embodiment, the visible light image data is generated so as to correspond to the IR image data generated by infrared light reception unit 120 in the one-to-one basis. Accordingly a position of the target in the visible light image data and a position of the target in the IR image data correspond to each other in the one-to-one basis. Note that the visible light image data is output from the output terminal of output unit 150 as a part of the output data.

2.2 IR Image Data

The IR image data is generated based on the IR light received by infrared light reception unit 120. The IR image data is transmitted to distance detector 143 and used for generation of the distance image data. The IR image data is output from the output terminal of output unit 150 as a part of the output data. Further, the IR image data is transmitted to contour extraction unit 144 and used for the contour extraction.

2.3 Distance Image Data

The distance image data is generated based on the distance data to the target detected by distance detector 143. The distance image data is generated as data including coordinate information and distance information. The distance image data is output from the output terminal of output unit 150 as a part of the output data.

2.4 Object ID Data

The object ID data is an identifier given to an object (that is, target) that is extracted by object extraction unit 148 from the distance image data. The object ID data is output from the output terminal of output unit 150 as a part of the output data.

Note that data generated by imaging device 100 is stored in a recording medium such as a memory (not illustrated) included in imaging device 100. In this case, output unit 150 may output the above data from the recording medium at appropriate timing.

3 DISTANCE DETECTION METHOD

Hereinafter, with reference to FIGS. 1, 3, 6, 7, a method for measuring the distance to the target by imaging device 100 illustrated in FIG. 1 will be described.

3.1 Distance Image Sensor

Figure 3:
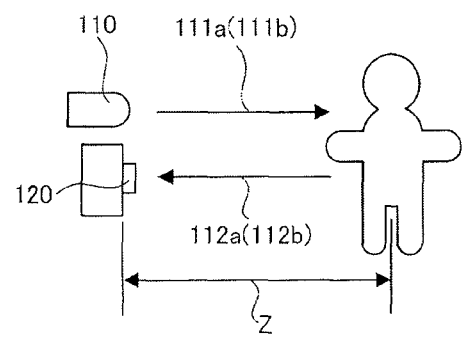
FIG. 3 is a schematic diagram illustrating a configuration of a TOF type distance image sensor.

With reference to FIGS. 1, 3, a configuration of the distance image sensor included in imaging device 100 will briefly be described first.

In imaging device 100 illustrated in FIG. 1, measurement of the distance to the target is performed by the TOF type distance image sensor. The distance image sensor is configured with infrared light irradiation unit 110, infrared light reception unit 120, and distance detector 143 that are described above.

As illustrated in FIG. 3, the TOF type distance image sensor measures distance Z to the target based on a time difference or a phase difference between irradiation timing of irradiation light 111a, 111b emitted by infrared light irradiation unit 110 and reception timing, at infrared light reception unit 120, of reflected light 112a, 112b that is light in which irradiation light 111a, 111b is reflected by the target (in FIG. 3, a person), respectively. Note that the distance image sensor can adopt various types of the TOF sensor.

3.2 Distance Detection Method

Figure 6:
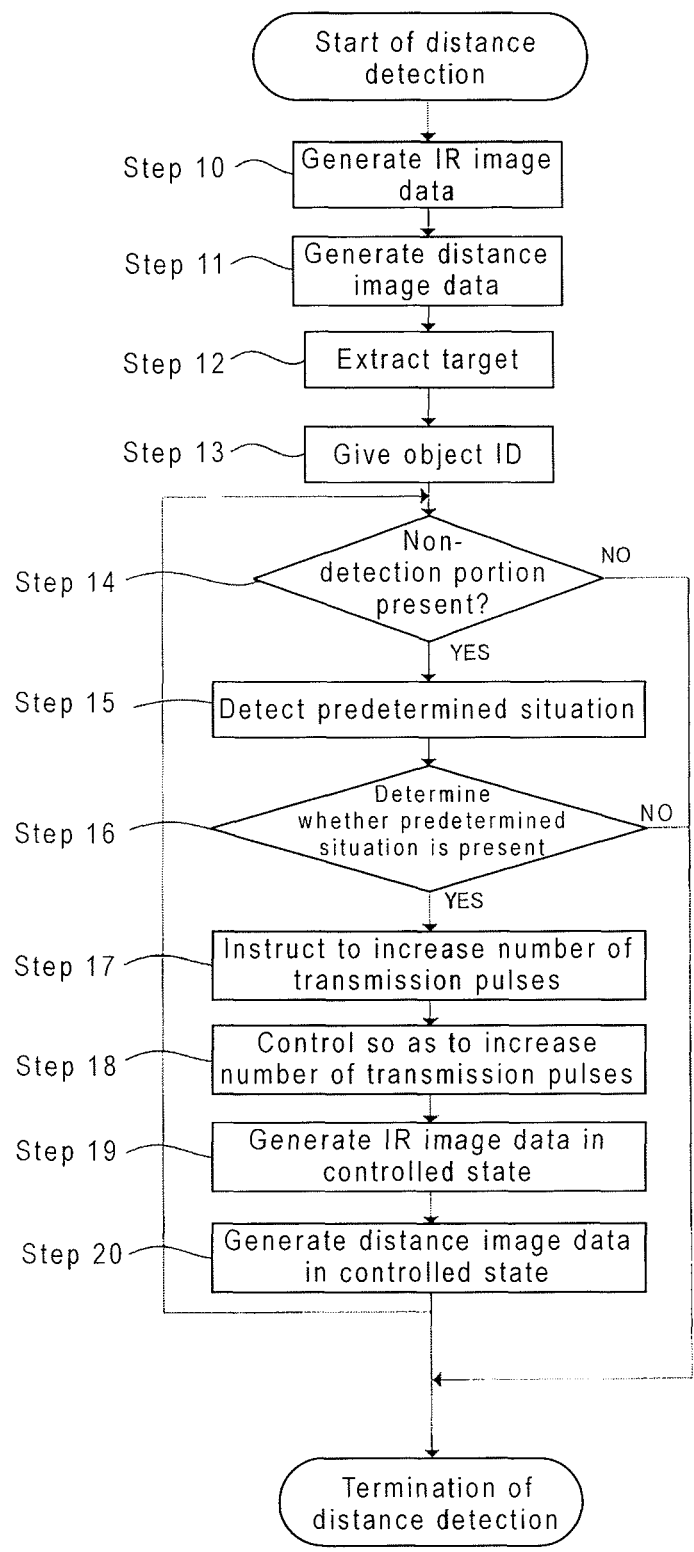
FIG. 6 is a flowchart of a distance detection method.
Figure 7:
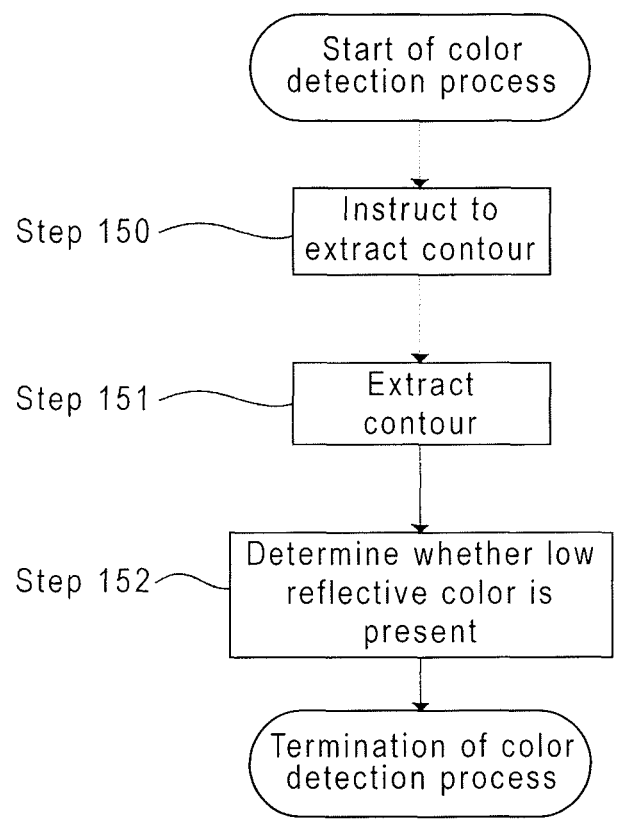
FIG. 7 is a flowchart of a process for detecting a color of a target.

Next, a distance detection method that is performed using imaging device 100 illustrated in FIG. 1 will be described with reference to FIGS. 6, 7. Note that FIG. 6 is a flowchart of the distance detection method. FIG. 7 is a flowchart of a color detection process.

Note that in the following description, a case where the target is black vehicle 201 as illustrated in FIG. 5A will be described. In FIG. 5A, a dark portion is attached with a slanted lattice.

In an image capture control method of the present exemplary embodiment, the IR image data is first generated based on IR light received by infrared light reception unit 120 in step 10 of FIG. 6.

Next, in step 11, distance detector 143 generates the distance image data based on distance data detected from the IR image data. Note that the distance detection method will be described later.

Next, in step 12, object extraction unit 148 extracts the target from the distance image data.

Next, in step 13, object extraction unit 148 generates the object ID for the object and gives an object ID to the object.

Next, in step 14, object extraction unit 148 determines whether a non-detection portion is present in the distance image data of the object. Note that the non-detection portion is a portion whose distance is not detected accurately.

A case where the non-detection portion is present in the distance image data of the target (that is, the object) will be described with reference to FIGS. 5A to 5D. Note that FIG. 5A is a view displaying the visible light image data of the black vehicle. FIG. 5B is a view displaying the distance image data of the vehicle illustrated in FIG. 5A obtained when the image capture control method of the present exemplary embodiment is not performed.

Figure 5D:
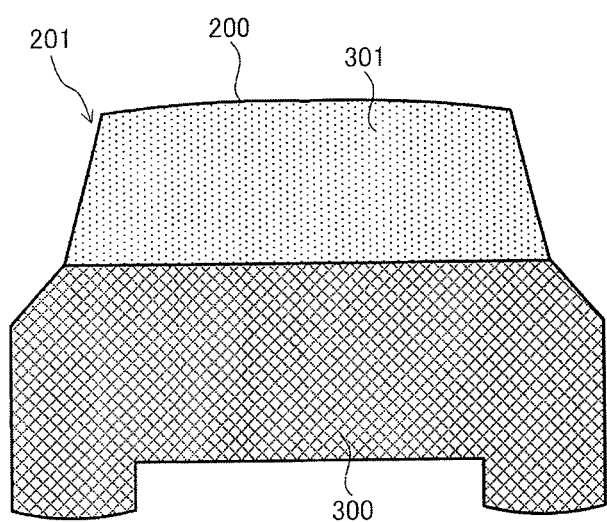
FIG. 5D is a view displaying the distance image data of the vehicle illustrated in FIG. 5A obtained when the image capture control method of the exemplary embodiment is performed.

FIG. 5C is a view displaying the contour of the object extracted from the visible light image data by the contour extraction unit while superimposing on the distance image of FIG. 5B. FIG. 5D is a view displaying the distance image data of the vehicle illustrated in FIG. 5A obtained when image capture control method of the present exemplary embodiment is performed.

Note that the case where the non-detection portion is present in the distance image data of the object is exemplified by a case where the distance image data of vehicle 201 illustrated in FIG. 5A is in a state illustrated in FIG. 5B.

In other words, when an accurate distance is detected, the distance image data of vehicle 201 illustrated in FIG. 5A is in a state illustrated in FIG. 5D. However, in the distance image data illustrated in FIG. 5B, the distance image data of a portion (that is, dark portion) other than head lights, a license plate, and a front grill of vehicle 201 is not generated appropriately.

In other words, the distance of the dark portion of vehicle 201 illustrated in FIG. 5A is not detected accurately. In this case, a portion corresponding to the dark portion (slanted lattice portion) of vehicle 201 illustrated in FIG. 5A in the distance image data illustrated in FIG. 5B corresponds to the non-detection portion.

In step 14, when "the non-detection portion being not present" is determined (NO in step 14), the distance detection process in this time is terminated without performing the image capture control method of the present exemplary embodiment.

On the other hand, in step 14, when "the non-detection portion being present" is determined (YES in step 14), recognition unit 141 detects whether the peripheral situation corresponds to the predetermined situation in step 15.

Specifically, in step 15, recognition unit 141 determines whether the backlight, the fog, or the low reflective color is present based on the visible light image data generated by visible light reception unit 130. Note that the backlight is detected by backlight detector 146. The fog is detected by fog detector 147. Further, the low reflective color is detected by color detector 145.

Hereinafter, in step 15, a method for detecting a color of the target by color detector 145 will be described.

3.3 Method for Detecting Low Reflective Color

FIG. 7 is the flowchart of the color detection process.

The following process is performed when recognition unit 141 determines that the non-detection portion is present in the distance image data of the target in step 14 of FIG. 6. The following describes a case where the target is vehicle 201 in FIG. 5A. However the target is not limited to the vehicle.

First, in step 150, object extraction unit 148 instructs contour extraction unit 144 to extract the contour of the target. Specifically, the target is, for example, an article including the head lights, the license plate, and the front grill (that is, vehicle 201 in FIG. 5A) in the distance image data illustrated in FIG. 5B.

Next, in step 151, contour extraction unit 144 extracts the contour of the target from the visible light image data. Specifically, contour extraction unit 144 extracts contour 200 of vehicle 201 from the visible light image data illustrated in FIG. 5A.

Next, in step 152, color detector 145 detects the low reflective color inside the contour of the target extracted by contour extraction unit 144 in the visible light image data. Specifically, color detector 145 detects a black or gray color present inside contour 200 of vehicle 201 in the visible light image data illustrated in FIG. 5A. The color detection process is then terminated, and the process returns to step 15 of FIG. 6.

Note that, even when the low reflective color is detected inside the contour of the target in the visible light image data, if an area of a low reflective color portion is less than or equal to a predetermined threshold value for the area, it may be determined that the low reflective color is not detected.

Figure 8:
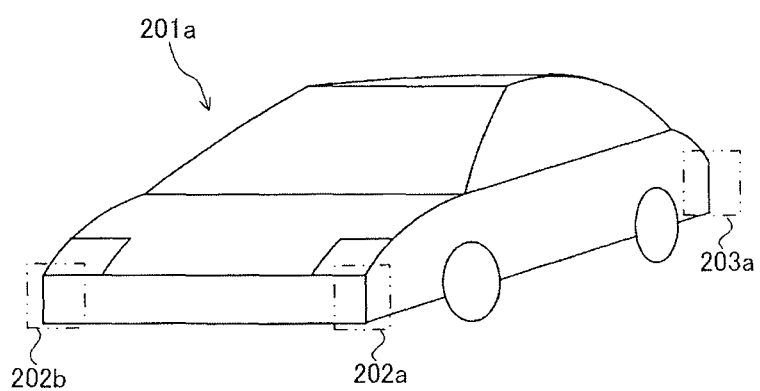
FIG. 8 is a schematic diagram of the vehicle when three corners thereof can be viewed.

Furthermore, for example, as in vehicle 201a illustrated in FIG. 8, whether the low reflective color is present may be determined based on colors of three corners 202a, 202b, 203a that can be detected in the visible light image data among two corners (that is, nooks) in the front end portion and both ends in a width direction of vehicle 201a and two corners (that is, nooks) in the rear end portion and both ends in the width direction of vehicle 201a.

Next, in step 16, recognition unit 141 determines whether the predetermined situation is detected (that is, whether to correspond to the predetermined situation). In step 16, when it is determined that the situation does not correspond to the predetermined situation (NO in step 16), the distance detection process in this time is terminated without performing the image capture control method of the present exemplary embodiment.

Note that the case of not corresponding to the predetermined situation is a situation where the backlight and the fog are not detected from the visible light image data, and the low reflective color is not detected from the target in the visible light image data.

On the other hand, in step 16, when it is determined that the situation corresponds to the predetermined situation (YES in step 15), the process proceeds to step 17.

Next, in step 17, recognition unit 141 instructs controller 142 to increase the pulse number of transmission pulses of infrared light irradiation unit 110.

Next, in step 18, controller 142 controls infrared light irradiation unit 110 to increase the pulse number of transmission pulses more than the pulse number of transmission pulses in the normal state. At the same time, controller 142 controls the exposure time and the exposure timing for infrared light reception unit 120 and visible light reception unit 130 according to the pulse number of transmission pulses emitted by infrared light irradiation unit 110.

Furthermore, controller 142 may set the frame rates for the IR image data and the visible light image data as described above, according to the pulse number of transmission pulses emitted by infrared light irradiation unit 110.

Next, in step 19, based on IR light received in a state where the pulse number of transmission pulses emitted by infrared light irradiation unit 110 is increased (hereinafter, referred to as a "controlled state"), infrared light reception unit 120 generates IR image data (hereinafter, referred to as "IR image data in a controlled state").

Next, in step 20, based on distance data detected from the IR image data in the controlled state, distance detector 143 generates distance image data (hereinafter, referred to as "distance image data in a controlled state"). Controller 142 then returns the process to step 14.

Note that the distance image data in the controlled state does not need to be generated for all IR image data in the controlled state. In other words, based on the function included in distance detector 143, distance detector 143 regionally divides the IR image data in the controlled state, and extracts a part of the IR image data including data of the target. Distance detector 143 may generate the distance image data based on the part of the IR image data. When only the part of the distance image data is processed in this manner, a processing load of distance detector 143 can be reduced, whereby a lowering amount of the frame rate can be reduced.

Note that, after the process returns to step 14 in the controlled state, when the non-detection portion is not present in the distance image data of the target in the distance image data in the controlled state, controller 142 controls infrared light irradiation unit 110 to put back the pulse number of transmission pulses to the pulse number of transmission pulses in the normal state. The distance detection process in this time is terminated.

Note that in the present exemplary embodiment, the case where the contour of the target is extracted from the visible light image data has been described. However, for example, when the distance image based on the IR image data is in the situation illustrated in FIG. 5B, it is obvious that the similar effect can be expected by collating the distance image with a pattern stored in an internal table to determine that this distance image is of an object with the low reflective color, and increasing the pulse number of transmission pulses through similar procedures.

4 DISTANCE DETECTION METHOD AND ACTIONS AND EFFECTS OF THE PRESENT EXEMPLARY EMBODIMENT

Subsequently, with reference to FIGS. 4A, 4B, the distance detection method and actions and effects of the present exemplary embodiment will be described below. In the following description, an example of a method for detecting a distance with a distance image sensor of a so-called indirect TOF type will be described.

Note that, when an image capture control method according to the present exemplary embodiment is performed, the indirect TOF type or a direct TOF type can be adopted as the distance image sensor. Further, with the image capture control method according to the present exemplary embodiment, similar actions and effects can be obtained regardless of the type of the distance image sensor.

4.1 Distance Detection Method

First, a method for detecting the distance to the target in a state where controller 142 does not control infrared light irradiation unit 110 to increase the pulse number of transmission pulses (hereinafter, referred to as a "normal state") will be described with reference to FIG. 4A.

In the normal state, irradiation light 111a of infrared light irradiation unit 110 includes first pulse 113 that is emitted first and second pulse 114 that is emitted with pulse interval $L_1$ spaced from first pulse 113, as illustrated in FIG. 4A. First pulse 113 and second pulse 114 are equal to each other in amplitude $H_1$ and width $T_p$.

Note that, in the normal state, controller 142 controls infrared light irradiation unit 110 to emit transmission pulses of a number having a margin with respect to an upper limit of irradiation capability.

For convenience of the description, in FIG. 4A, only a single pulse set including first pulse 113 and second pulse 114 is illustrated. However the irradiation light can be configured with a plurality of pulse sets.

Controller 142 controls infrared light reception unit 120 to perform exposure at timing synchronized with that of first pulse 113 and second pulse 114. In the present exemplary embodiment, as illustrated in FIG. 4A, infrared light reception unit 120 performs three times of exposure that are exposure $S_0$, exposure $S_1$, and exposure BG with respect to reflected light 112a that is light in which irradiation light 111a is reflected by the target.

Specifically, in exposure $S_0$, the exposure is started simultaneously with start of irradiation with first pulse 113 (that is, the rise of first pulse 113), and is terminated after performing the exposure for exposure time $T_0$ that is preset according to a relationship with irradiation light 111a. Exposure $S_0$ is exposure for receiving reflected light of first pulse 113.

Note that light reception data (that is, light amount information) $D_0$ with exposure $S_0$ includes reflected light component $S_0$ of first pulse 113 attached with a slanted lattice and background component BG attached with a satin pattern in FIG. 4A. Reflected light 112a is attenuated so as to be smaller than irradiation light 111a, so that amplitude $H_2$ of reflected light component $S_0$ is smaller than amplitude $H_1$ of first pulse 113.

Herein, time difference Δt is present between the rise of first pulse 113 and the rise of reflected light component $S_0$ of first pulse 113. In other words, reflected light component $S_0$ of first pulse 113 rises after time difference Δt elapses from the rise of first pulse 113.

Time difference Δt is a time that is required by light to reciprocate a route with distance Z (refer to FIG. 3) from imaging device 100 to the target.

In exposure $S_1$, the exposure is started simultaneously with termination of irradiation with second pulse 114 (that is, the fall of second pulse 114), and is terminated after performing the exposure for exposure time $T_0$ similar to exposure $S_0$. Exposure $S_1$ is exposure for receiving the reflected light of second pulse 114.

Light reception data $D_1$ with exposure $S_1$ includes component $S_1$ (a slanted lattice portion in FIG. 4A) of a part of the reflected light component of second pulse 114 and background component BG attached with the satin pattern in FIG. 4A.

Note that component $S_1$ of the part of the reflected light component can be expressed by Expression (1) below.

$$S_1 = S_0 \times (\Delta t / T_P) \qquad \text{[Expression 1]}$$

In exposure BG, the exposure is started at timing excluding reflected light components of first pulse 113 and second pulse 114, and is terminated after performing the exposure for exposure time $T_0$ similar to exposure $S_0$ and exposure $S_1$.

Exposure BG is exposure for receiving only an infrared light component in external light (that is, a background component). Accordingly, light reception data $D_{BG}$ with exposure BG includes only background component BG indicated with the satin pattern in FIG. 4A.

From a relationship between irradiation light 111a and reflected light 112a as described above, distance Z from imaging device 100 to the target can be calculated with Expressions (2) to (4) below. Here "$T_P$" is a width of each of first pulse 113 and second pulse 114, and "c" is a light speed. Note that $D_{BG}$ in the following expressions is light reception data generated with exposure BG described above.

$$S_0 = D_0 - D_{BG} \qquad \text{[Expression 2]}$$

$$S_1 = D_1 - D_{BG} \qquad \text{[Expression 3]}$$

$$\begin{aligned} Z &= c \times (\Delta t / 2) \\ &= \{(c \times T_P)/2\} \times (\Delta t / T_P) \\ &= \{(c \times T_P)/2\} \times (S_1 / S_0) \end{aligned} \qquad \text{[Expression 4]}$$

When distance Z is detected with the above-described method, with small amplitude of each of the reflected light components of first pulse 113 and second pulse 114 (that is, with lowered intensity), signal-to-noise (SN) ratios of light reception data $D_0$ and light reception data $D_1$ are decreased, whereby detection accuracy of distance Z may be lowered.

Hence, with the image capture control method according to the present exemplary embodiment, when a situation in which light intensity of each of the reflected light components of first pulse 113 and second pulse 114 is lowered (that is, the predetermined situation) is present, controller 142 controls infrared light irradiation unit 110 to increase the pulse number of transmission pulses.

Hereinafter, with reference to FIG. 4B, a method for detecting the distance to the target in the controlled state will be described.

In the following description, an example in which a pulse number of transmission pulses per frame is increased to twice the pulse number of transmission pulses in the normal state will be described. Note that the description of an overlapping portion with the description in the normal state will be omitted.

In the controlled state, irradiation light 111b of infrared light irradiation unit 110 is configured with pulse sets twice those in the normal state as illustrated in FIG. 4B. In other words, irradiation light 111b in the controlled state includes two pulse sets each of which is similar to the pulse set in the normal state illustrated in FIG. 4A. Amplitude $H_1$ and width $T_P$ of each of first pulse 113 and second pulse 114 configuring the pulse set are similar to those in the normal state.

In the controlled state, two pulse sets each of which includes first pulse 113 and second pulse 114 configure one frame of the distance image data. Consequently, controller 142 causes the frame rates for the visible light image data generated by visible light reception unit 130 and the IR image data generated by infrared light reception unit 120 that has received reflected light 112b to be lower than the frame rates in the normal state.

Note that, for convenience of the description, the pulse number of transmission pulses of irradiation light 111b illustrated in FIG. 4B is increased to be twice that of irradiation light 111a illustrated in FIG. 4A. Note that the irradiation light in the controlled state is not limited to the case in FIG. 4B.

Exposure timing of infrared light reception unit 120 is similar to the case illustrated in FIG. 4A. In other words, infrared light reception unit 120 performs three times of exposure that are exposure $S_0$, exposure $S_1$, and exposure BG with respect to each of two pulse sets configuring irradiation light 111b.

In particular, in the controlled state, reflected light component $S_0$ of first pulse 113 in the first pulse set and reflected light component $S_0$ of first pulse 113 in the second pulse set are added to each other. Note that reflected light component $S_0$ is calculated with above Expression (2).

On the other hand, component $S_1$ of a part of a reflected light component of second pulse 114 in the first pulse set and component $S_1$ of a part of a reflected light component of second pulse 114 in the second pulse set are added to each other. Note that component $S_1$ of the part of the reflected light component is calculated with above Expression (3).

The added values are substituted into above Expression (4) to detect distance Z from imaging device 100 to the target. Note that, upon performing the addition described above, white noise is reduced, thereby suppressing an influence of the white noise on detection accuracy of distance Z.

4.2 Actions and Effects of the Present Exemplary Embodiment

As described above, according to the present exemplary embodiment, even when backlight or fog is present in the periphery or the target has the low reflected light reflective color (that is, when the peripheral situation corresponds to the predetermined situation), the distance from imaging device 100 to the target can be detected with high accuracy. As a result distance image data accurately reflecting the distance to the target can be generated.

In other words, in the present exemplary embodiment, when the peripheral situation corresponds to the predetermined situation, infrared light irradiation unit 110 is controlled to increase the pulse number of transmission pulses.

Specifically, in the normal state in which the image capture control method of the present exemplary embodiment is not performed, when intensity of each of the reflected light components of first pulse 113 and second pulse 114 is lowered (that is, when the SN ratio is lowered), infrared light irradiation unit 110 is controlled such that irradiation light 111b whose transmission pulses are increased more than those of irradiation light 111a in the normal state is emitted.

Then reflected light components $S_0$ of reflected light 112b are added to each other, and components $S_1$ of parts of the reflected light components of reflected light 112b are added to each other. As a result, the SN ratio of data used for detection of the distance is increased, whereby distance Z can be detected with high accuracy.

Accordingly, as illustrated in FIG. 5B, even when the non-detection portion is present in the distance image data of the target, distance Z can be detected with high accuracy by performing the image capture control method of the present exemplary embodiment. This can generate the distance image data accurately reflecting the distance to the target as illustrated in FIG. 5D.

Note that, for convenience of the description, in FIG. 5D, portion 300 with a shorter distance is attached with a slanted lattice, and portion 301 with a longer distance is attached with a satin pattern.

5 APPENDIX

In steps 17, 18 of the flowchart in FIG. 6, controller 142 may decrease the pulse number of transmission pulses as a condition for the transmission pulses emitted by infrared light irradiation unit 110. Specifically, when the non-detection portion is present in step 14 and when the reflection rate of light received by infrared light reception unit 120 is higher than a predetermined value or when brightness data is saturated, such as light reflected by a reflection plate, in steps 15, 16, controller 142 may instruct infrared light irradiation unit 110 to decrease the pulse number of transmission pulses in step 17, and infrared light reception unit 110 may be controlled to decrease the pulse number of transmission pulses in step 18.

Figure 4C:
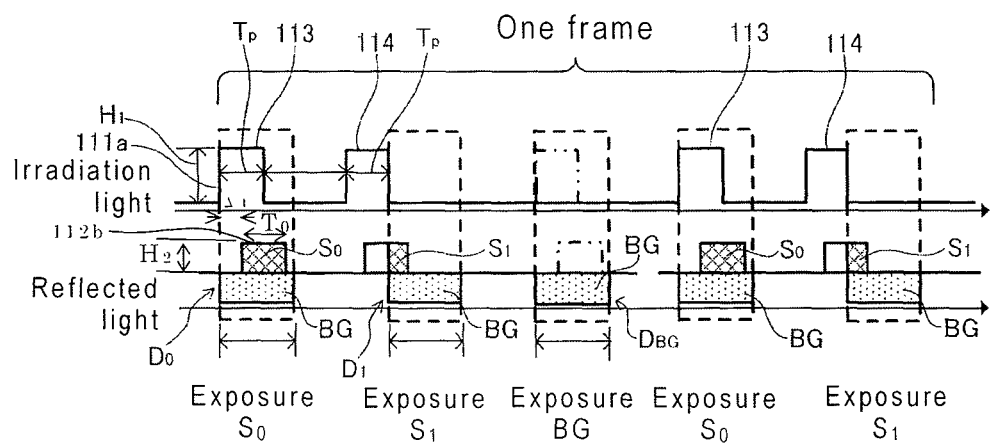
FIG. 4C is a schematic diagram illustrating a modified example of the irradiation light and the reflected light when the image capture control method of the exemplary embodiment is performed.

As another example, in the controlled state, controller 142 can control infrared light reception unit 120 to perform the exposure at timing illustrated in FIG. 4C. Specifically, controller 142 controls infrared light reception unit 120 to omit second exposure BG among exposures illustrated in FIG. 4B.

Configurations of recognition unit 141 and controller 142 in image capture control device 140 may be implemented by a computer program. The computer program may be provided while being stored in a recording medium such as a digital versatile disc (DVD), or may be stored in a recording medium such as a server device on a network, which can be downloaded through the network.

Alternatively, recognition unit 141 and controller 142 in image capture control device 140 can be implemented as physical circuits such as large-scale integration (LSI).

INDUSTRIAL APPLICABILITY

An image capture control device, an image capture control method, a program, and a recording medium according to the present disclosure are suitable for an imaging device mounted on a vehicle, for example.

REFERENCE MARKS IN THE DRAWINGS

100: imaging device
110: infrared light irradiation unit
111a, 111b: irradiation light
112a, 112b: reflected light
113: first pulse
114: second pulse
120: infrared light reception unit
130: visible light reception unit
140: image capture control device
141: recognition unit
142: controller
143: distance detector
144: contour extraction unit
145: color detector
146: backlight detector
147: fog detector
148: object extraction unit
150: output unit
160: image sensor
201, 201a: vehicle
200: contour
202a, 202b: corner
203a: corner
300: portion with shorter distance
301: portion with longer distance

The invention claimed is:

1. An image capture control device that controls an imaging device, the imaging device including an infrared light irradiation unit, an infrared light reception unit, and a visible light reception unit, the image capture control device comprising:
    a distance detector that measures a distance to a target that reflects transmission pulses with a time-of-flight (TOF) method, based on a time difference between a time when the infrared light irradiation unit emits the transmission pulses and a time when the infrared light reception unit receives infrared light;
    a recognition unit that determines whether a peripheral situation of peripheral of the imaging device corresponds to a predetermined situation based on image data generated by the visible light reception unit that has received visible light; and
    a controller that causes the infrared light irradiation unit to increase a pulse number of the transmission pulses to be emitted to the target when the recognition unit determines that the peripheral situation corresponds to the predetermined situation.

2. The image capture control device according to claim 1, wherein the predetermined situation is a situation in which the target has a low reflective color that is a color whose reflection rate to the transmission pulses is less than a predetermined threshold value for the reflection rate.

3. The image capture control device according to claim 2, wherein
    the distance detector generates distance image data based on infrared image data generated by the distance detector, and
    the recognition unit extracts the target from the distance image data, and gives an object identification (ID) to the target.

4. The image capture control device according to claim 3, wherein the recognition unit extracts a contour of the target from the image data, and determines whether the low reflective color is present inside the contour.

5. The image capture control device according to claim 4, wherein the recognition unit determines whether a portion having a distance difference greater than or equal to a predetermined value in a portion corresponding to an inner side of the contour in the distance image data, and, when the recognition unit determines that the portion having the distance difference is present, determines whether a peripheral situation corresponds to the predetermined situation based on the image data.

6. The image capture control device according to claim 2, wherein the controller controls the infrared light irradiation unit to increase the pulse number of the transmission pulses, and increase pulse intensity of the transmission pulses.

7. The image capture control device according to claim 2, wherein the recognition unit extracts a part of infrared image data, the part being of the target and regionally divided from the infrared image data generated by the distance detector, and generates distance image data based on the part of the infrared image data.

8. The image capture control device according to claim 2, wherein the controller that causes the infrared light irradiation unit to increase a pulse number of the transmission pulses to be emitted to the target when the recognition unit determines that the target includes the low reflective color, and a relative speed with the target is less than or equal to a predetermined threshold value for the relative speed.

9. The image capture control device according to claim 1, wherein the controller lowers a frame rate of infrared image data generated by the distance detector when increasing the pulse number of the transmission pulses.

10. The image capture control device according to claim 9, wherein the controller determines whether an area rate of a portion with the low reflective color in the target with respect to a whole of the target in the image data is less than or equal to a predetermined threshold value for the area rate, and does not decrease the frame rate of the infrared image data when determining that the area rate is less than or equal to the predetermined threshold value for the area rate.

11. The image capture control device according to claim 9, wherein the controller determines whether the target is a moving object, and does not decrease the frame rate of the infrared image data when determining that the target is the moving object.

12. The image capture control device according to claim 1, wherein the predetermined situation is a situation where backlight is present in the periphery.

13. The image capture control device according to claim 1, wherein the predetermined situation is a situation where fog is present in the periphery.

14. An image capture control method that controls an imaging device including an infrared light irradiation unit, an infrared light reception unit, and a visible light reception unit, the image capture control method comprising:
  measuring a distance to a target that reflects transmission pulses with a time-of-flight (TOF) method, based on a time difference between a time when the infrared light irradiation unit emits the transmission pulses and a time when the infrared light reception unit receives infrared light;
  determining whether a peripheral situation corresponds to a predetermined situation of the peripheral of imaging device based on image data generated by the visible light reception unit that has received visible light; and
  controlling the infrared light irradiation unit to increase a pulse number of the transmission pulses to be emitted to the target when the peripheral situation is determined to correspond to the predetermined situation.

15. A non-transitory computer-readable storage medium that stores an executable program for an image capture control method that controls an imaging device including an infrared light irradiation unit, an infrared light reception unit, and a visible light reception unit, the program causing a computer to perform:
  measuring a distance to a target that reflects transmission pulses with a time-of-flight (TOF) method, based on a time difference between a time when the infrared light irradiation unit emits the transmission pulses and a time when the infrared light reception unit receives infrared light;
  determining whether a peripheral situation corresponds to a predetermined situation based on image data generated by the visible light reception unit that has received visible light; and
  controlling the infrared light irradiation unit to increase a pulse number of the transmission pulses to be emitted to the target when the peripheral situation is determined to correspond to the predetermined situation.

\* \* \* \* \*